(12) United States Patent
Huang et al.

(10) Patent No.: US 7,607,342 B2
(45) Date of Patent: Oct. 27, 2009

(54) METHOD AND APPARATUS FOR REDUCING LATERAL INTERACTIVE FORCES DURING OPERATION OF A PROBE-BASED INSTRUMENT

(75) Inventors: Lin Huang, Goleta, CA (US); Charles Meyer, Santa Barbara, CA (US)

(73) Assignee: Vecco Instruments, Inc., Santa Barara, CA (US)

( * ) Notice: Subject to any disclaimer, the term of this patent is extended or adjusted under 35 U.S.C. 154(b) by 0 days.

(21) Appl. No.: 11/380,338

(22) Filed: Apr. 26, 2006

(65) Prior Publication Data

US 2007/0251305 A1 Nov. 1, 2007

(51) Int. Cl.
G01B 5/28 (2006.01)
G01N 13/16 (2006.01)

(52) U.S. Cl. ...................................................... 73/105
(58) Field of Classification Search ................... None
See application file for complete search history.

(56) References Cited

U.S. PATENT DOCUMENTS

| | | | |
|---|---|---|---|
| 5,077,473 A * | 12/1991 | Elings et al. ................ 250/306 |
| 5,210,410 A * | 5/1993 | Barrett ........................ 250/234 |
| 5,210,714 A * | 5/1993 | Pohl et al. ................... 365/157 |
| 5,266,801 A | 11/1993 | Elings et al. |
| RE34,489 E | 12/1993 | Hansma et al. |
| 5,317,533 A | 5/1994 | Quate et al. |
| 5,400,647 A * | 3/1995 | Elings ........................ 73/105 |
| 5,412,980 A | 5/1995 | Elings et al. |
| 5,576,483 A | 11/1996 | Bonin |
| 5,866,807 A | 2/1999 | Elings et al. |
| 5,959,200 A * | 9/1999 | Chui et al. ................... 73/105 |
| 6,026,677 A | 2/2000 | Bonin |
| 6,189,374 B1 | 2/2001 | Adderton et al. |
| 6,530,266 B1 | 3/2003 | Adderton et al. |
| 6,672,144 B2 | 1/2004 | Adderton et al. |
| 2006/0243036 A1 * | 11/2006 | Lee et al. ..................... 73/105 |

FOREIGN PATENT DOCUMENTS

WO  WO2005/066609 A1 * 7/2005

OTHER PUBLICATIONS

Hoh et al., "Friction Effects on Force Measurements with an Atomic Force Microscope", Langmuir vol. 9, 3310-12, 1993.*

(Continued)

Primary Examiner—Daniel S Larkin
(74) Attorney, Agent, or Firm—Boyle Fredrickson, S.C.

(57) ABSTRACT

A cantilever probe-based instrument is controlled to reduce the lateral loads imposed on the probe as a result of probe/sample interaction. In a preferred embodiment, the probe tip and/or sample are driven to move laterally relative to one another as a function of cantilever deflection in order to compensate for lateral tip motion that would otherwise be caused by cantilever deflection. In the case of a probe having a passive cantilever, the sample and/or the probe as a whole are driven to move laterally to obtain the desired magnitude of compensation as direct function of cantilever deflection. In the case of a probe having an active cantilever, the sample or probe may be moved as a function of cantilever drive signal, or the cantilever may be controlled to bend as a function of cantilever drive signal so that the tip moves to obtain the desired magnitude of compensation.

33 Claims, 13 Drawing Sheets

OTHER PUBLICATIONS

Dvorak et al., "Nanotribometer: a New Instrument for Nanoscale to Micron-Scale Friction and Wear Measurements", Tribology Letters, vol. 4, 199-204, 1998.*

Vanlandingham, M.R., et al., Relating Elastic Modulus to Indentation Response Using Atomic Force Microscopy, Journal of Materials Science Letters (1997) pp. 117-119.

Cannara, R.J., et al., Cantilever Tilt Compensation for Variable-Load Atomic Force Microscopy, Rev. Sci. Instrum. 76, 053706 (2005) (6 pages).

Veeco, Nanoindentation and Nanoscratching with SPMs for NanoScope Version 5.30 Rev. 2 Software, Support Note No. 013-225-000, Rev. G. (2005), pp. 1-45.

* cited by examiner

METHOD AND APPARATUS FOR REDUCING LATERAL INTERACTIVE FORCES DURING OPERATION OF A PROBE-BASED INSTRUMENT

STATEMENT OF GOVERNMENT INTEREST

This invention was made with United States government support awarded by the following agency: NIST/ATP (Award #70NANB4H3055). The United States has certain rights in this invention.

BACKGROUND OF THE INVENTION

1. Field of the Invention

The present invention is directed to probe-based instruments and, more particularly, relates to a method and apparatus for reducing or minimizing lateral forces on the probe of the instrument during probe/sample interaction.

2. Description of Related Art

Several probe-based instruments monitor the interaction between a cantilever-based probe and a sample to obtain information concerning one or more characteristics of the sample. For example, scanning probe microscopes (SPMs) typically characterize the surface of a sample down to atomic dimensions by monitoring the interaction between the sample and a tip on a cantilever-based probe probe. By providing relative scanning movement between the tip and the sample, surface characteristic data can be acquired over a particular region of the sample, and a corresponding map of the sample can be generated.

The atomic force microscope (AFM) is a very popular type of SPM. The probe devices of the typical AFM includes a very small cantilever which is fixed to a support at its base and which has a sharp probe tip attached to the opposite, free end. The probe tip is brought very near to or into contact with a surface of a sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as a strain gauge, capacitance sensor, etc. The probe is scanned over a surface using a high-resolution three axis scanner acting on the sample support and/or the probe. The instrument is thus capable of creating relative motion between the probe and the sample while measuring the topography, elasticity, or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

AFMs may be designed to operate in a variety of modes, including contact mode and oscillating mode. In contact mode operation, the microscope typically scans the tip across the surface of the sample while keeping the force of the tip on the surface of the sample generally constant. This effect is accomplished by moving either the sample or the probe assembly vertically to the surface of the sample in response to sensed deflection of the cantilever as the probe is scanned horizontally across the surface. In this way, the data associated with this vertical motion can be stored and then used to construct an image of the sample surface corresponding to the sample characteristic being measured, e.g., surface topography. Alternatively, some AFMs can at least selectively operate in an oscillation mode of operation such as TappingMode™ (TappingMode is a trademark of Veeco Instruments, Inc.) operation. In TappingMode™ operation the tip is oscillated at or near a resonant frequency of the cantilever of the probe. The amplitude or phase of this oscillation is kept constant during scanning using feedback signals, which are generated in response to tip-sample interaction. As in contact mode, these feedback signals are then collected, stored, and used as data to characterize the sample.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

When a cantilever presses against a sample surface with increasing force, such as is the case when the probe is used to indent the sample or to create force vs. displacement curves, the tip of the probe moves laterally due to the cantilever bending. To apply a force to the sample for the purposes of, e.g., obtaining an indentation measurement, the fixed end of the cantilever is moved vertically through a distance $\Delta z$ with the tip in contact with the sample. The resultant cantilever bending generates a force $k \cdot \Delta z$, where k is the spring constant of the cantilever. This force is not, however, applied entirely normal to the cantilever. A component of the force instead is imposed laterally or along the length and/or width of the cantilever. This component was historically deemed to be non-problematic because the lateral component of the applied force vector is typically much smaller than the normal component. However, it has been discovered that the lateral force can in fact be an order of magnitude higher than the normal force.

The reasons for this somewhat counterintuitive characteristic of AFM operation can be appreciated from FIG. 1A, which schematically shows an AFM probe P interacting with a sample S during an indenting operation. The probe P includes a cantilever C having a tip T. The cantilever C is fixed on or formed integrally with a base B. The probe P is typically inclined at an angle $\alpha$ of about 10° to 15° relative to the surface of the sample S in order to assure adequate clearance between the probe holder and the sample and in order to facilitate data acquisition by a probe detector assembly. As the probe-sample spacing in the z direction is decreased (by movement of the probe P toward the sample and/or by movement of the sample S toward the probe P in the z direction) to increase the indentation force, the lateral distance available to the cantilever C in the plane L decreases. This decrease creates a compressive strain along the length of the cantilever C and results in cantilever bending as seen in FIG. 1B. Since the cantilever C has a much higher stiffness along its length in the plane L than perpendicular to its length in the plane N, the majority of the applied force is actually directed in the lateral direction in the plane L. The resulting forces tend to cause the probe tip T to displace laterally so that the tip T engages the sample S at a location $E_{ACT}$ that is offset from the point $E_{DES}$ of desired engagement by an offset X as seen in FIG. 1B.

This lateral motion of the tip is undesirable since the resulting lateral forces negatively affect the shape of the surface indentations. In the absence of relative probe/sample measurements, material piles up uniformly in front of and behind the tip as seen in FIG. 2A. For instance, if the lateral forces tend to push the tip T away from the base, sample material tends to pile up disproportionately ahead of the probe tip T as seen in FIG. 2B. Conversely, if the lateral forces tend to pull the tip toward the base, material tends to pile up disproportionately behind the tip T as seen in FIG. 2C. In either event, the indentation is non-uniform, leading to inaccuracies in the resulting indentation data such as errors in the acquired force vs. displacement curves.

Some current AFM indentation tools attempt to reduce the lateral forces on a probe by moving the probe laterally away from the indentation point as the probe-sample spacing decreases. For instance, the Nanoscope software, employed in some microscopes manufactured by the assignee of the present application, includes a correction called an "x rotation" feature which moves the sample or tip laterally in proportion to the vertical or z motion of the sample or tip, whichever is being driven. An AFM 10 configured to perform the function is illustrated in FIG. 3. It includes a probe device 12 configured to indent or otherwise interact with sample S mounted on a support 26. The probe device 12 includes a probe 14 supported on a substrate 16. The probe 14 includes a cantilever 18 bearing a tip 20 that interacts with the sample S. The cantilever 18 includes a base or fixed end 22 extending from substrate 16, and a free, distal end 24 that receives the tip 20. The sample support 26 is movable in the xy plane under operation of an xy actuator 28, for example. Preferably, sample support 26 is also movable in a z direction that is perpendicular to an xy plane of the sample support 26 under the power of a z actuator 30. The z direction is typically vertical. Cantilever deflection is monitored by an optical detection system in the form of a detector 32 that receives light emitted from a laser 34 and reflected from the cantilever 18.

In operation, the cantilever deflection data obtained from the detector 32 is manipulated in a controller (not shown) and used to generate a feedback signal that it is amplified in an amplifier 36 and then used to actuate the z actuator 30, with the resultant drive signal providing information indicative of sample characteristics in a known manner. The controller also transmits a drive signal to the xy actuator 28 via an amplifier 38 so as to move the sample S relative to the probe 14 to affect a scanning operation. The scanning operation typically comprises a so-called raster scan in which data is taken in a first or x direction in a series of lines that are spaced from one another in a second or y direction typically substantially perpendicular to the x direction.

Pursuant to the x rotation technique discussed above, the signal to the xy actuator 28 is modified with an x rotation scaling signal or compensation designed to at least partially compensate for lateral loads on the probe 14 resulting from sample/probe interaction. That modification is shown schematically as taking place in an adder 40 located upstream of amplifier 38. The compensation signal is proportional of the drive signal applied to the z actuator 30. The magnitude of the compensation signal is based solely or at least primarily on the geometric configuration of the AFM and is largely independent of cantilever deflection.

Hence, this approach merely adds an x-offset voltage to the signal from the xy actuator that is proportional to the z-voltage applied to the z actuator 30 without taking into account the properties of the sample, the cantilever, or the interaction between the two. This approach is less than optimally effective for several reasons, particularly if the cantilever 18 is not substantially stiffer than the sample. For instance, a cantilever of a given stiffness will bend more for a given amount of z-travel when the probe is driven against a relatively hard surface than when it is driven against a relatively soft surface, resulting in greater lateral deflection and the need for more compensation. The x-rotation software does not take this variable into account. It also ignores the effects of cantilever motion such as bending on lateral deflection. It also fails to take tip sharpness into account. As a result, "x rotation" control is sometimes ineffective, and, even when it is effective for a particular probe-sample combination, it tends to have low repeatability.

Axially symmetric indenters have been developed that lack the need for lateral compensation. However, these instruments have low mechanical bandwidth (on the order of 300 Hz) and relatively poor sensitivity because they are subject to high levels of noise. For instance, MTS and Hysitron produce nano-indentation devices in which an indenter tip such as a Berkovich tip is driven into a sample using a multi-plate capacitor transducer system. The device has drive and pickup plates mounted on a suspension system. It provides relative movement between the plates when the forces applied to the pickup plates drive the probe into contact with the sample. The change in space between the plates provides an accurate indication of the probes vertical movement. The input actuation forces and vertical position readout are therefore all-decoupled, resulting in a generally purely symmetrical indentation process. In practice, the sensor element is mounted on a scanning tunneling microscope, and a sample is mounted on the sensor. The force sensor then can be used for both measuring the applied force during micro indentation or micro hardness testing and for imaging before and after the testing to achieve an applied AFM-type image of the surface before and after the indentation process. Systems of this type are described, e.g., in U.S. Pat. No. 5,576,483 to Bonin and U.S. Pat. No. 6,026,677 to Bonin, both assigned to Hysitron Incorporated.

While the indenter described above provides axially symmetric indentation, it has a very low bandwidth because of the relatively large mass of the capacitive plates. The instrument also cannot obtain an accurate image of indentations, particularly in relatively elastic samples, because of sample rebound between the indentation and image acquisition passes and because of the large tip radius inherent in the indenter tip. It also has relatively poor force sensitivity, on the order of 15 nano-Newtons, as opposed to a few nano-Newtons for a true AFM having a much smaller tip.

The need has arisen to effectively and reliably reduce the lateral forces imposed on a probe as a result of probe-sample interaction.

SUMMARY OF THE INVENTION

In accordance with a first aspect of the invention, one or more of the above-identified needs is met by providing a probe-based instrument that can be controlled to reduce the lateral loads that would otherwise be imposed on the probe as a result of probe/sample interaction. "Lateral" in this regard means perpendicular to the direction of probe and/or sample movement during an indenting or similar interaction in which the probe engages the sample. This interaction movement is traditionally said to occur in the "z" direction. "Lateral" in this regard therefore means in either the x direction and/or the y direction.

In a preferred embodiment, the probe tip and/or sample are driven to move laterally relative to one another as a function of a parameter indicative of cantilever deflection movement in order to compensate for lateral tip motion that would otherwise be caused by cantilever deflection. In the case of a probe having a passive cantilever, the parameter is cantilever deflection, and the sample and/or the probe as whole are driven to move laterally to obtain the desired magnitude of compensation. In the case of a probe having an active cantilever, the parameter is the drive voltage supplied to the active cantilever, and the probe and/or sample are driven to move or the cantilever is controlled to bend so that the tip moves to obtain the desired magnitude of compensation.

In accordance with another aspect of the invention, the instrument is calibrated to obtain the desired movement. The instrument may be calibrated for lateral force reduction via any of a variety of techniques. For instance, lateral compensation can be adjusted as the instrument is scanned over a trench or other feature until observed shifts in the image, resulting from lateral under-compensation or overcompensation, are eliminated. In another technique, deflection curves can be observed as a probe is forced into a hole or similar feature, and lateral compensation can be adjusted until the curves lack marked changes of slope indicative of overcompensation or under-compensation. Still another technique is to adjust lateral compensation as indentations are made in an anisotropic material such as PDA and to directly observe the material's response to changes in lateral compensation until sample tearing is at least substantially avoided. Other techniques are possible as well.

Lateral compensation can be performed with instruments having passive cantilevers as well as those having active cantilevers. It also can be performed with instruments in which the probe is scanned relative to the sample and vice versa. It can also be performed either with or without feedback.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

As discussed briefly in the Summary section above, an aspect of the invention lies in the controlled movement of a probe and/or sample of an AFM or other probe-based instrument as a function of cantilever deflection or a parameter indicative of cantilever deflection in order to reduce or eliminate lateral forces on a probe during probe/sample interaction, hence permitting the formation of axially symmetric indents and the accurate determination of applied vertical load. The method is applicable to both instruments having a passive cantilever and those having an active cantilever and may be performed in either an open loop or closed loop fashion. Preferred techniques for calibrating an instrument are also disclosed.

Figure 1A:
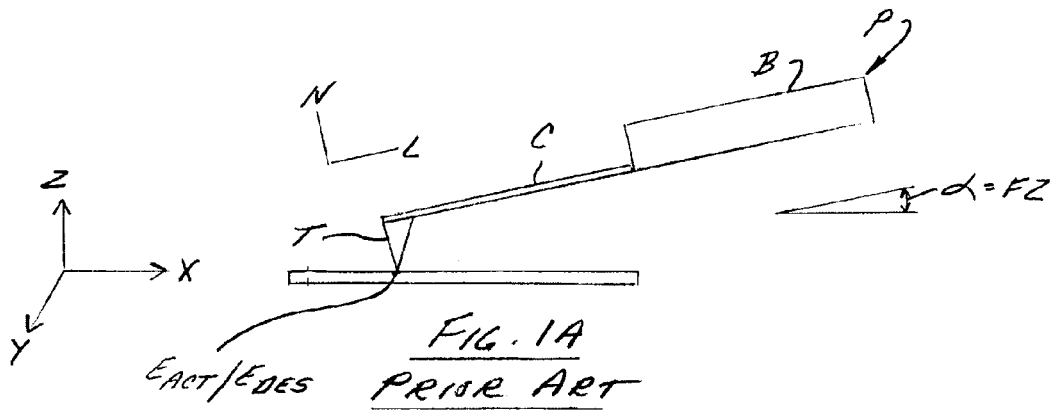
FIGS. 1A and 1B schematically illustrate operation of a conventional passive cantilever based probe of an AFM during a sample indentation process, appropriately labeled PRIOR ART.
Figure 1B:
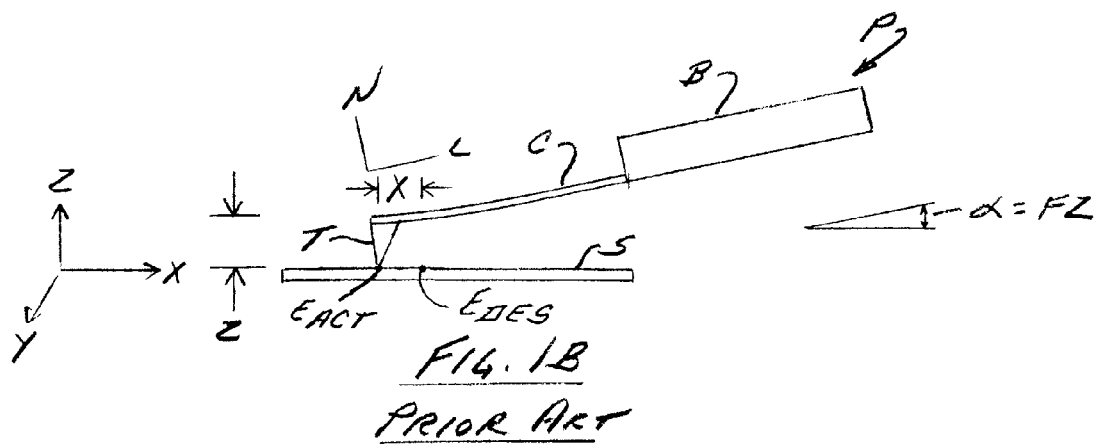
Figure 1C:
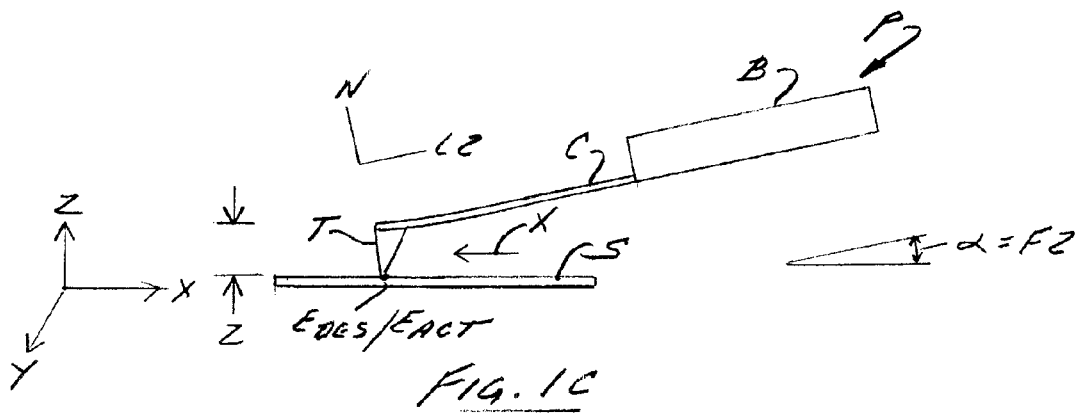
FIG. 1C schematically illustrates a technique for reducing lateral loads on the probe of FIGS. 1A and 1B during a sample indentation process, performed in accordance with an embodiment of the invention.

Referring first to FIG. 1C, lateral force reduction as applied to an SPM having a passive cantilever-based probe P preferably involves moving the tip T and/or samples laterally as a function of cantilever deflection to compensate for lateral tip motion that otherwise would be caused by cantilever deflection. The probe P may comprise any of the type commonly found in AFMs and other SPMs. The illustrated probe includes a cantilever C bearing a tip T that interacts with a sample S during indentation. Cantilever C includes a fixed end, preferably extending from a base and a free, distal end that receives tip T. The probe P and/or the sample S can be driven to effect relative movement therebetween in the x, y, and z directions.

The relative lateral movement is effected by applying a drive voltage to the xy actuator for either a sample support (see FIG. 5B below) or the probe (see FIG. 5A below) that varies as a function of measured cantilever deflection. Unlike the x-rotation prior art mentioned above in which the compensation signal is applied at least primarily as a function of the drive voltage to the instrument's z-actuator, the applied voltage is not directly dependent on the drive voltage to the z actuator but, instead, is precalibrated for any given cantilever deflection value.

Figure 4A:
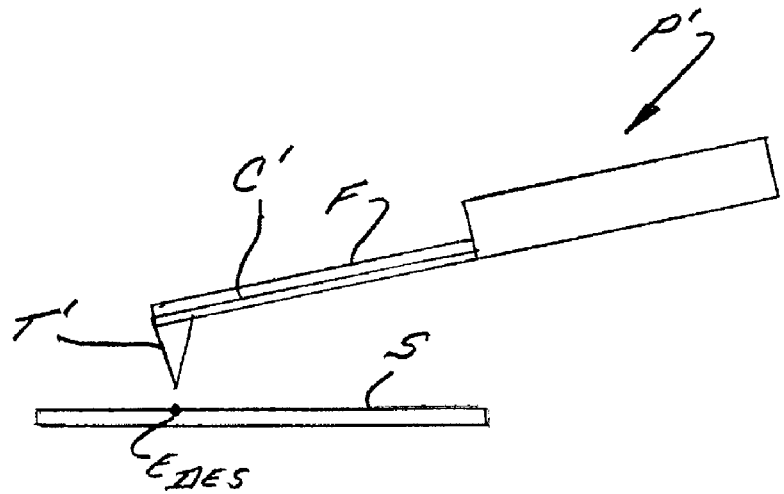
FIGS. 4A-4C schematically illustrate a technique for reducing lateral loads on the probe of an active cantilever based AFM during a sample indentation process, performed in accordance with an embodiment of the invention.
Figure 4B:
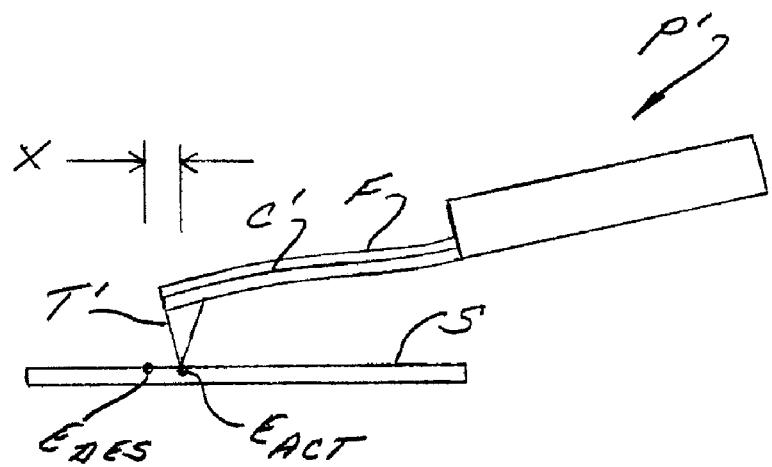

Referring to FIGS. 4A and 4B, an "active cantilever" C' of a probe P' could also be controlled to compensate for lateral loads on the tip T'. The active cantilever C' could be any number of cantilevers that can be deformed in a controlled manner. It may, for example, be one that deforms under induced thermal stress, one that deforms under electromagnetic forces, one that deforms under ultrasonic pressure, and/or one that deforms under photon pressure. It preferably is piezoelectric composite cantilever, more preferably one that contains a layer of a ZnO piezoelectric film F on the active cantilever C', for instance, between two metal electrodes deposited on a silicon cantilever, thus forming a "bimorph" device. By applying a voltage to the actuator's electrodes, the actuator bends towards or away from the sample surfaces. Active cantilevers of this type were originally developed for AFMs at Stanford University. Similarly, active cantilevers and control systems are described, for instance, in U.S. Pat. No. 5,317,533 to Quate et al. and U.S. Pat. Nos. 6,672,144, 6,530,266, and 6,189,374 to Adderton et al., the disclosures of each of which are hereby incorporated by reference in their entirety.

Figure 4C:
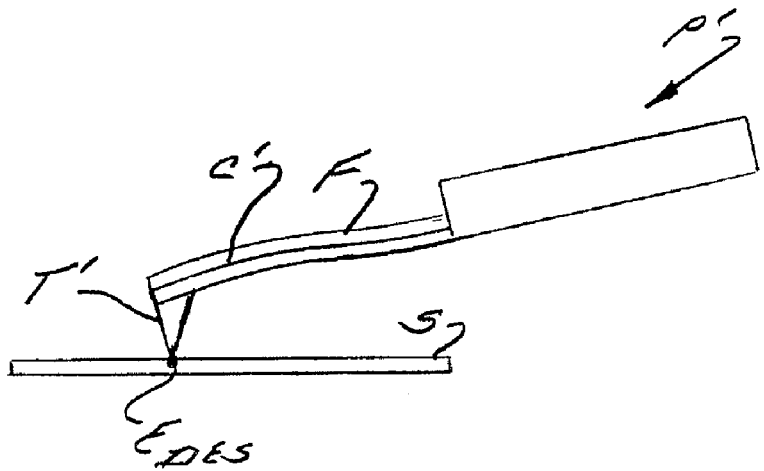

In active cantilever based systems, it is sometimes desirable to control the drive signal to the active cantilever and/or the z actuator to maintain the angle α at the tip of the cantilever relative to the z plane constant. In this case, there is no measurable change in deflection angle at the free end of the cantilever to serve as a basis for controlling relative probe sample movement. However, as seen in FIG. 4B, the tip T' may still move laterally due to deflection of other sections of the cantilever as whole, resulting in a lateral offset X between the desired point of sample engagement $E_{DES}$ and the actual point $E_{ACT}$. The lateral movement resulting from this deflection is a function to drive voltage applied to the active cantilever. In this case, lateral tip motion can be compensated for as a function of the drive signal to the active cantilever because deflection of the bent portion of the cantilever is a direct function of that voltage. That is, for any particular drive signal voltage, a precalibrated compensation voltage can be applied to the AFM's xy actuator to compensate for tip lateral motion and reduce lateral forces on the tip T' as seen in FIG. 4C.

Figure 5A:
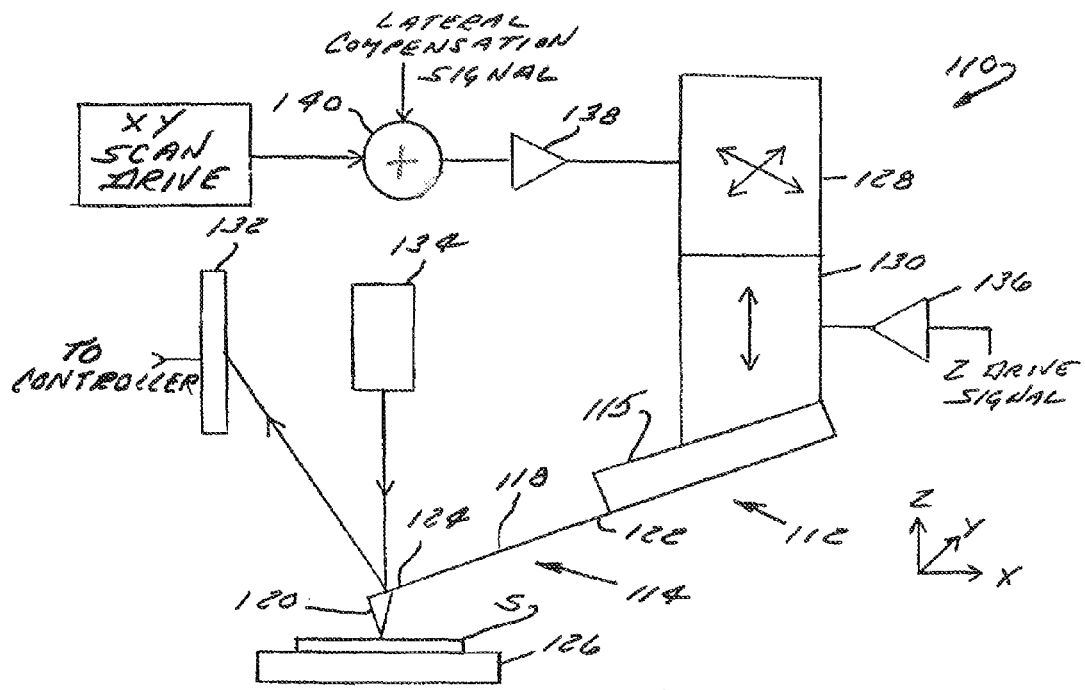
FIG. 5A schematically illustrates an AFM constructed in accordance with a first preferred embodiment of the present invention.

Referring now to FIG. 5A, an AFM 110 constructed in accordance with a first embodiment of the present invention is shown that has a probe device 112 configured to indent a sample S mounted on a support 126. The probe device 112 includes a probe 114 extending from a base 115. The probe 114 includes a cantilever 118 bearing a tip 120 that interacts with sample S during indentation. Cantilever 118 includes a fixed end 122, contiguous with base 115, and a free, distal end 124 that receives tip 120. Cantilever 118 of this embodiment is passive and, accordingly, lacks a piezoelectric bimorph element or other element that that can be energized to bend the cantilever 118 to raise and lower the tip 120 independently of z-actuator operation. The probe device 112 of this embodiment is mounted on an actuator assembly including a z actuator 130 and an xy actuator 128. The xy actuator 128 is energizable to drive the probe 114 in mutually orthogonal "x" and "y" directions in an xy plane that is parallel to a plane of the sample support 126. The xy plane is typically horizontal. The z actuator 130 drives the probe 114 to move in a direction that is perpendicular to the xy plane and is typically vertical. Both actuators 128 and 130 typically comprise piezoelectric actuators. Cantilever deflection is measured by a detector located above the probe device 112. The detector may, for example, comprise an optical detector having a four quadrant photodetector 132 and a laser 134. A controller, only components of which are shown, receives signals from the photodetector 132 and controls operation of the xy actuator 128 and the z actuator 130.

In operation, the interaction between tip 120 and the surface sample S deflects cantilever 118. This deflection is detected by the photodetector 132, which transmits corresponding deflection signals to the controller. The resultant data is used to produce information reflecting vertical and lateral deflection of the cantilever 118. That information can then be demodulated, either in analog or digital circuitry located external to the controller, or circuitry within the controller, to obtain information regarding the lateral and vertical positions of the probe, as well as phase information, if the probe 114 is operating in an oscillating mode such as TappingMode™ operation. When used in conjunction with very small microfabricated cantilevers and piezoelectric positioners as lateral and vertical scanners, AFMs of the type contemplated by the present invention can have resolution down to the molecular level, and can operate with controllable forces small enough to image biological substances.

With continued reference to FIG. 5A, the controller or a separate dedicated controller (not shown) energizes the z actuator 130 via an amplifier 136 to move the probe 114 in the z direction to indent with or otherwise engage the sample according to the user's requirements. The controller or a separate, dedicated controller, also transmits a lateral compensation signal to the xy actuator 128 in order effect lateral force reduction. The xy actuator 128 may be controlled to move the probe 114 in the x direction, the y direction, or a combination of both. The compensation signal is preferably added to an xy scan drive signal, such as raster scan signals. This addition is schematically illustrated as taking place in an adder 140 located upstream of an amplifier 138. This compensation voltage may be applied in the x direction, the y direction, or a combination of both. Because the lateral forces imposed on the cantilever 118 are reduced during probe/sample interaction, the force on the sample S therefore is a simple function of the indentation voltage applied to the z actuator 130. If the frame compliance is neglected, the applied force is $F=k \cdot S \cdot V$, where F is the applied force, k is the cantilever spring constant, S is the piezo sensitivity, and V is the applied voltage.

Figure 5B:
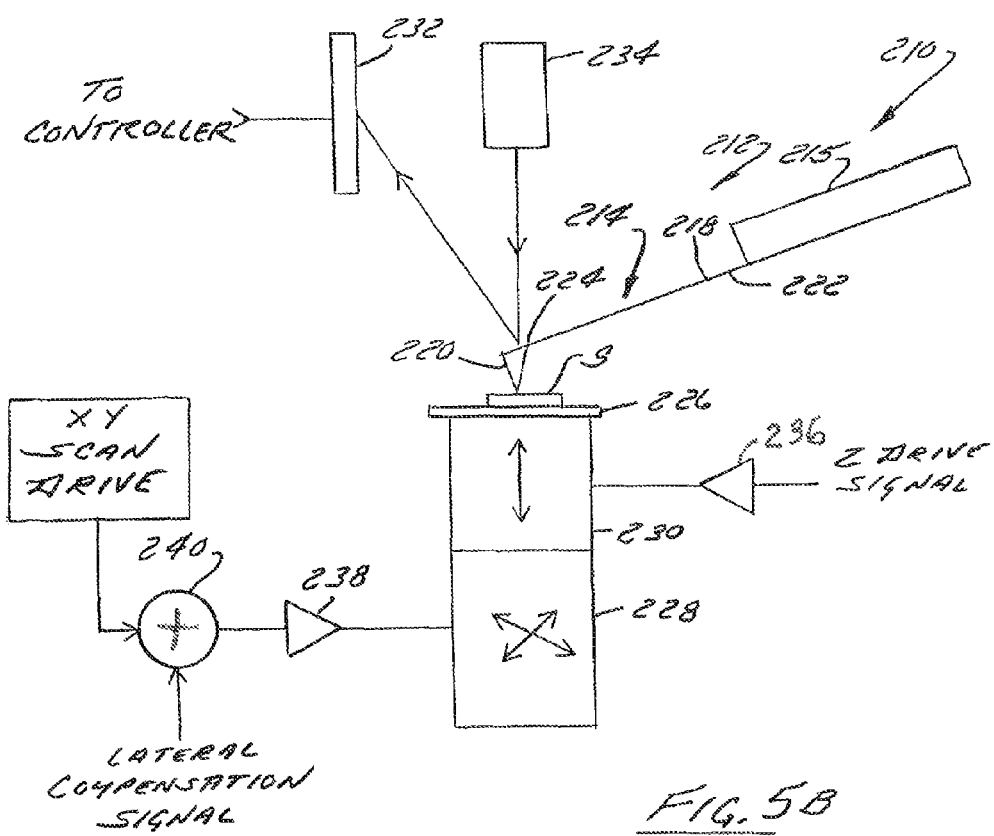
FIG. 5B schematically illustrates an AFM constructed in accordance with a second preferred embodiment of the present invention.

Another embodiment of an AFM 210 configured to reduce lateral forces on the probe during sample indentation is illustrated in FIG. 5B. The AFM 210 of this embodiment is similar to the AFM 110 of the embodiment of FIG. 5A, and components thereof having corresponding components to those of FIG. 5A are therefore designated by the same reference numerals, incremented by 100. The AFM 210 includes a stationary probe device 212 and a sample support 226. In this embodiment, sample support 226 is movable in the x, y, and z directions relative to the probe device 212 via actuation of an xy actuator 228 and a z actuator 230, both located under the sample support 226. Probe device 212 includes probe 214 having a cantilever 218 and tip 220. The cantilever 218 includes a fixed end 222 attached and extending from base 215, and a free, distal end 224 that receives the tip 220. A deflection detection system, including a photodetector 232 and a laser 234, is provided for measuring cantilever deflection.

With continued reference to FIG. 5B, the controller or a separate dedicated controller (not shown) energizes the z actuator 230 via an amplifier 236 to move the probe 214 in the z direction to indent with or otherwise engage the sample according to the user's requirements. The controller also drives the sample support 226 to move in the xy plane for scanning purposes via the transmission of a control signal to the xy actuator 230 via an amplifier 238. The xy actuator 228 also receives the lateral compensation signal, which is combined with the scanning signal from an xy scan drive in an adder 240 located upstream of amplifier 238.

Figure 5C:
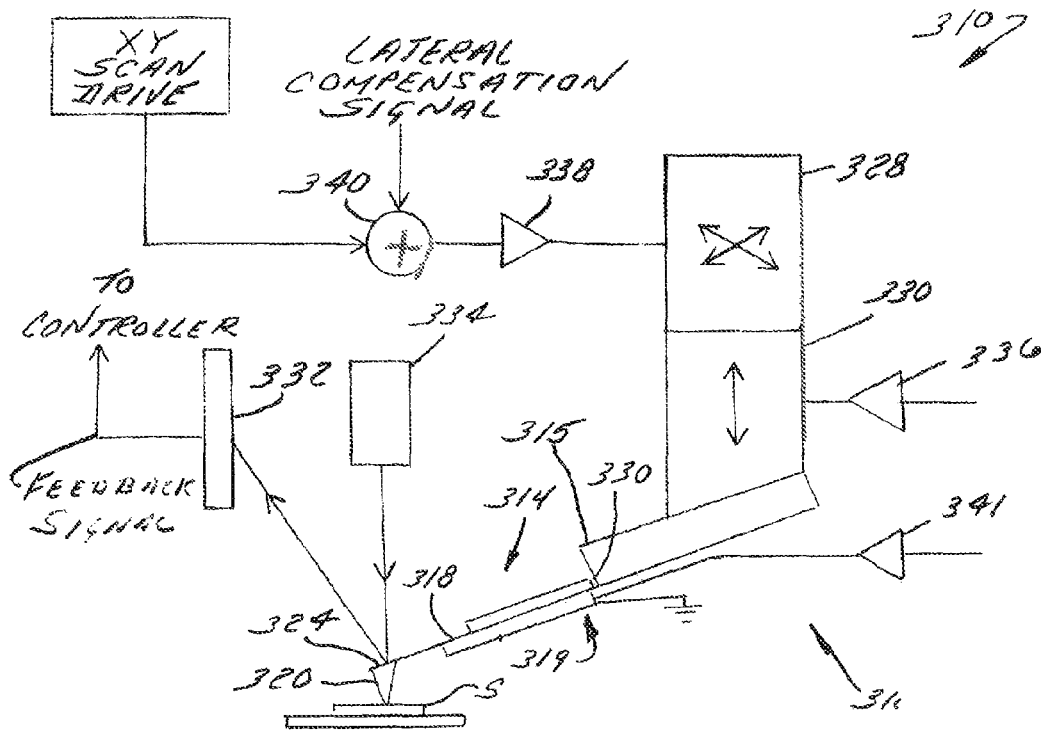
FIG. 5C schematically illustrates an AFM constructed in accordance with a third preferred embodiment of the present invention.

In still another embodiment, illustrated in FIG. 5C, the probe 314 of the probe device 312 includes an active cantilever 318 rather than a passive cantilever. The AFM 310 of this embodiment is similar to the AFM of the embodiment of FIG. 5B, and components thereof having components corresponding to those of FIG. 5B are therefore designated by the same reference numeral, incremented by 100. The probe 314 includes a cantilever 318 bearing a tip 320 that interacts with a sample S during an AFM operation indentation. Cantilever 318 includes a fixed end 322, preferably attached to a base 315 and a free, distal end 324 that receives tip 320. Cantilever 318 of this embodiment is an active cantilever having a piezoelectric bimorph element 319 or other element 319 that can be energized to bend the cantilever 318 to raise and lower the tip 320 independently of z actuator operation. The probe device 312 of this embodiment is mounted on an actuator assembly including an xy actuator 328 and a z actuator 330. (The xy actuator could alternatively be used to move the sample support, as in the embodiment of FIG. 5B.) Cantilever deflection is measured by an optical detector including a position sensitive photodetector 332 and a laser 334. A controller, only components of which are shown, receives signals from the photodetector 332 and controls operation of the xy actuator 328 and the z actuator 330.

Lateral force compensation can be achieved through control of xy actuator 328. In this case, the adder 340 receiving the compensation signal may be placed in the signal path leading to the amplifier 338 for the xy actuator 328.

In operation, the interaction between tip 320 and sample surface S deflects the cantilever 318. This deflection is detected by the photodetector 332, which transmits a corresponding deflection signal to the controller. The resultant data is used to produce information reflecting vertical and lateral deflection of the cantilever. That information can then be demodulated, either in external analog or digital circuitry located external to the controller, or in circuitry within the controller, to obtain information regarding the lateral and vertical positions of the probe 314. The controller or a separate dedicated controller (not shown) may use feedback from the detector 332 to energize the bimorph element 319 of the active cantilever 318 to move the probe 314 in the z direction to indent with or otherwise engage the sample S. The compensation signal, which is supplied to the adder 340 and combined with the scan signal, is a function of the drive signal to the active cantilever as discussed above in conjunction with FIGS. 4A-4C.

Figure 6:
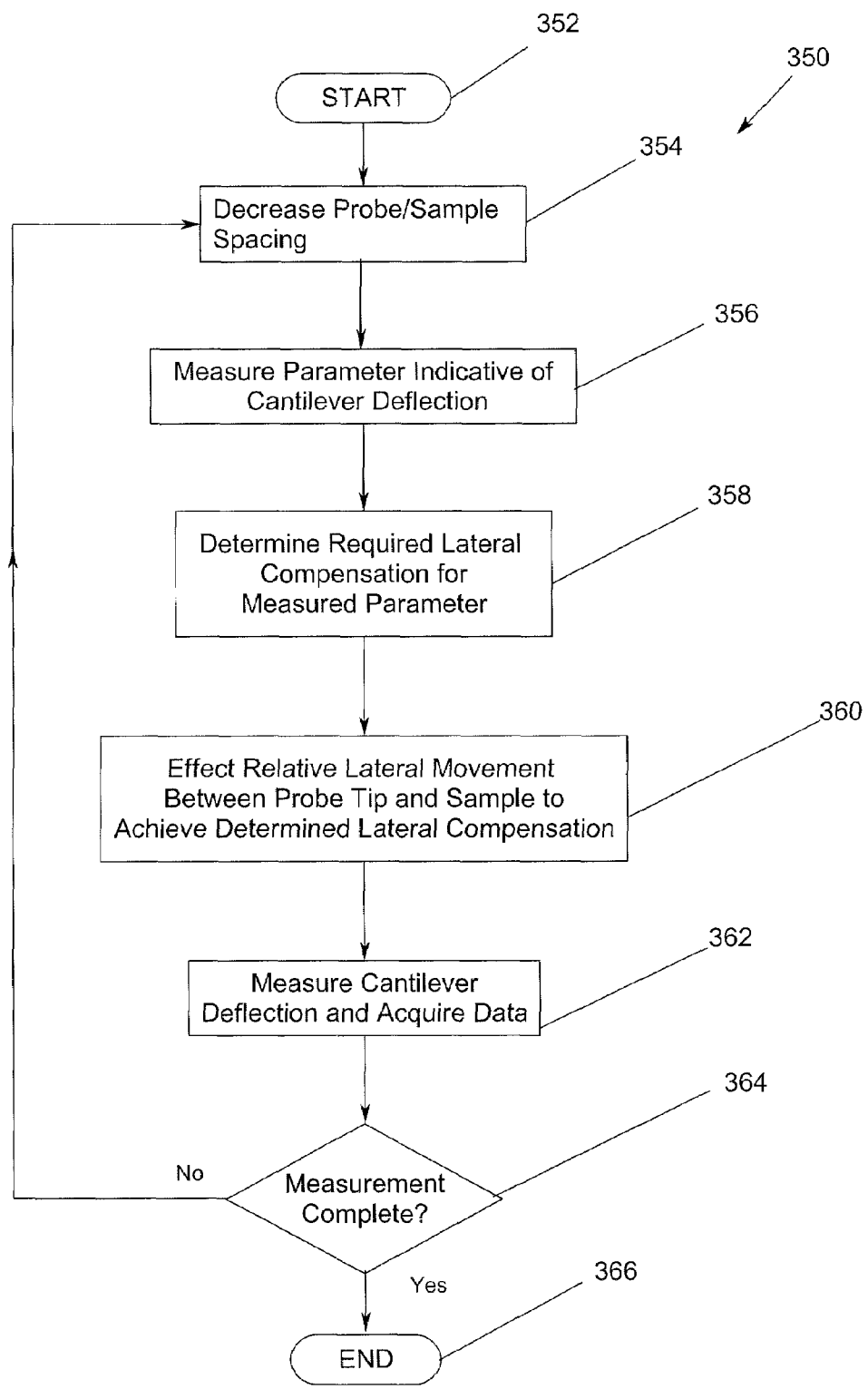
FIG. 6 is a flowchart of a process usable to control the AFM of FIGS. 5A, 5B, or 5C to obtain indentation measurements while reducing lateral loads on the AFM's probe.

Referring to FIG. 6, a possible process 350 for controlling one of the AFMs described above to calibrate the probe is illustrated. The process 350 proceeds from START in Block 352 to Block 354, where a controller actuates the AFM's z actuator to decrease the probe/sample spacing. The process 350 then measures cantilever deflection in Block 356, using signals from the AFM's photodetector. The process 350 then proceeds to Block 358, where the required lateral compensation for the measured deflection is determined. Specifically, in the case of a probe having a passive cantilever, the magnitude of compensation is preferably determined directly as a function of cantilever deflection, using precalibrated data acquired, for example, via any of the various techniques described below in conjunction with FIGS. 7A-14. In the case of a probe having an active cantilever, the magnitude of lateral compensation is preferably determined as a function of drive signal to the active cantilever. As described above, that voltage is still indicative of the magnitude of tip lateral movement and of a parameter of cantilever deflection. Then, in Block 360, the appropriate actuator(s) is controlled to effect the required lateral compensation in the x and/or y direction. This control could be purely open loop or, could be closed loop. The measured cantilever deflection, which is now essentially free of any tip offset in the lateral deflection, can then be acquired and used as data for the measurement of interest, such as indentation depth and location. That data acquisition is represented by Block 362. The process 350 then inquires in Block 364 to determine if the measurement is complete, and cycles through Blocks 354-364 until the sample indentation or other measurement process is complete. The process 350 then proceeds to END in Block 366.

Various techniques are available for calibrating a SPM to determine the amount of lateral compensation required for a given cantilever deflection or other AFM parameter that is at least indirectly indicative of cantilever deflection. Several techniques will now be described. By and large, these techniques are not mutually exclusive, and others may be available.

A first technique involves the scanning of a characteristic of a sample feature and adjusting the gain on an xy actuator to eliminate offset in an image of that characteristic resulting from lateral probe tip displacement. The characteristic may, for example, be a magnetic field, a thermal field, a capacitive field, an inductive field, or a physical topographic feature. The inventive technique will now be described in conjunction with the scanning of a topographic feature in the form of a trench TR by way of example only. It is preferably performed in accordance with the process 400 illustrated in the flowchart of FIG. 9.

Figure 7A:
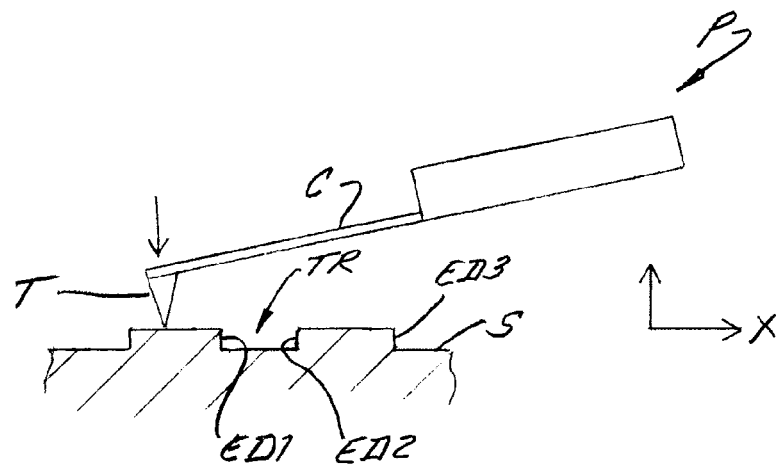
FIGS. 7A and 7B collectively schematically illustrate a first method of calibrating an AFM to reduce lateral loads imposed on the probe during probe/sample interaction.
Figure 7B:
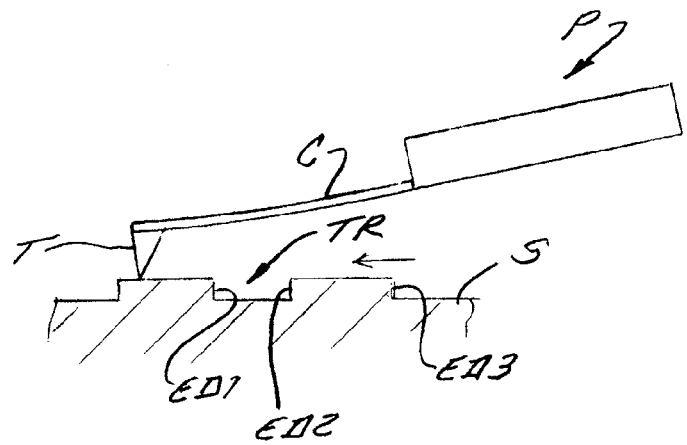
Figure 8A:
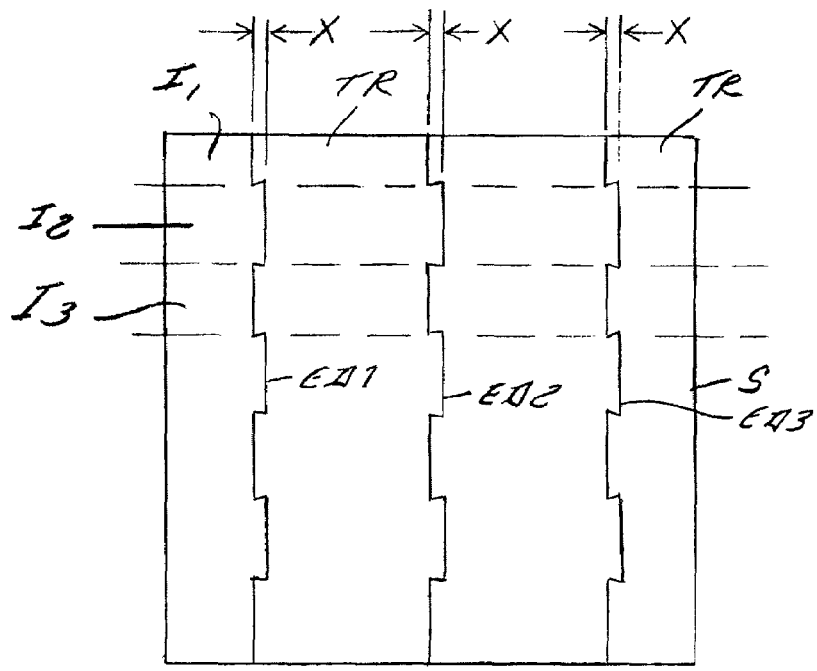
FIGS. 8A and 8B each show a series of images acquired during the calibration process of FIGS. 7A and 7B, with FIG. 8A showing a series of images of the same features acquired at various cantilever deflection values prior to calibration, and FIG. 8B showing a series of images of the same features acquired at various cantilever deflection values after calibration is complete.
Figure 8B:
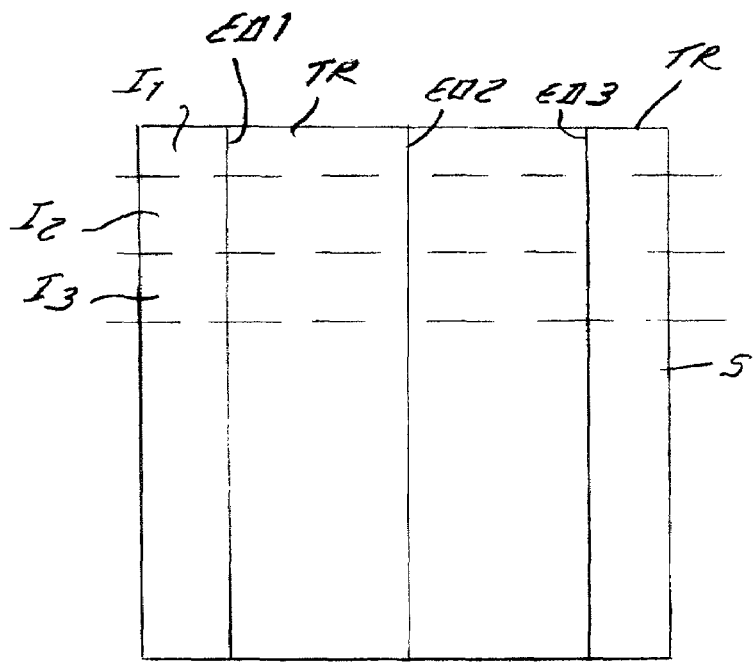
Figure 9:
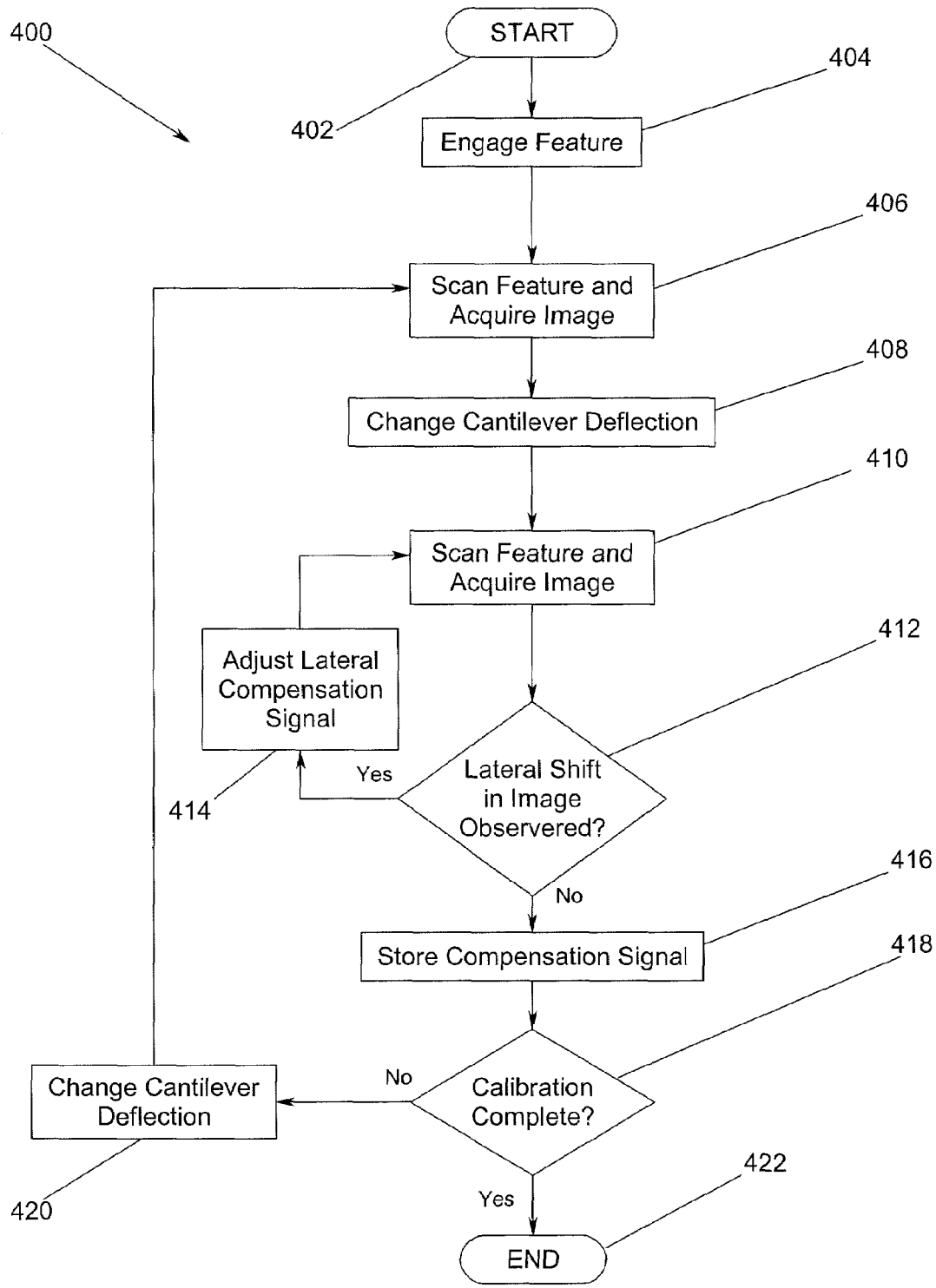
FIG. 9 is a flowchart of a process usable to effect the calibration technique illustrated in FIGS. 7A and 7B.

Process proceeds from START 402, at which time the tip T is positioned above the trench TR as illustrated in FIG. 7A, to Block 404, where the tip T engages trenches TR as seen in FIG. 7B. The probe P is then scanned back and forth across the edges ED1, ED2, and ED3 of the trenches TR in the x direction in "contact mode," and the resulting image is acquired in Block 406. The resultant image can be seen at $I_1$ in FIG. 8A. Then, in Block 408, the z spacing between the sample S and the probe P is varied to change the deflection of the cantilever C. The process 400 then proceeds to Block 410, where the same feature is scanned again without moving the scanner in the y direction, and the resultant image is acquired. That image is seen at I2 in FIG. 8A. The process 400 then inquires in Block 412 if the newly acquired image shifted laterally when compared to the previously acquired image. The comparison and identification of any shift can be observed either manually or automatically, for example, with pattern recognition software. Shifts in images I2, I3, etc., observed when scanning the trench TR at various different deflections, are illustrated in FIG. 8A. The shifts "X" between the apparent locations of each of the edges ED1, ED2, and ED3 in the various images $I_2$, $I_3$, etc. indicate that compensation is either non-existent or inaccurate.

When an image shift is detected, the process 400 proceeds to Block 414, where the gain to the AFM's xy actuator is adjusted to alter lateral compensation. The adjustment may be performed either manually via manipulation of a dial or similar control, or via software programmed into the AFM's controls. The process 400 then returns to Block 410, where the image is scanned again and the resultant image is again compared to the original image in Block 412. The lateral compensation adjustment, scanning, and operation steps are repeated until the noted offset is eliminated. This effect can be seen in FIG. 8B, in which the observed locations of any given trench edge for various cantilever deflection values are aligned in the images I1, I2, and I3. The desired calibration signal for the prevailing cantilever deflection is then stored in Block 416. The process 400 then inquires in Block 418 if calibration is complete and, if not, proceeds to Block 420, where the z actuator is energized to change the deflection of the cantilever, and the process of Blocks 406-418 is repeated for a full range of cantilever deflections. At the end of this time, the observed locations of the any particular trench edge are the same for all values of cantilever deflection, as can bee seen in FIG. 8B. The process 400 then proceeds to END in Block 422.

A disadvantage of this calibration technique is that scanning takes place in contact mode and, therefore, produces substantial forces on the tip T. These forces may lead to fairly rapid tip wear and even possibly tip breakage. This is because the bending forces required to bend the cantilever are transmitted through the tip T. In the case of a probe P having an active cantilever, however, the forces applied on the tip can be substantially reduced during the above-identified calibration process by bending the cantilever not by changing a probe/sample spacing but by changing the drive voltage to the active cantilever. As a result, scanning can be done in contact mode with reduced forces or even in other modes such as TappingMode™.

Figure 10:
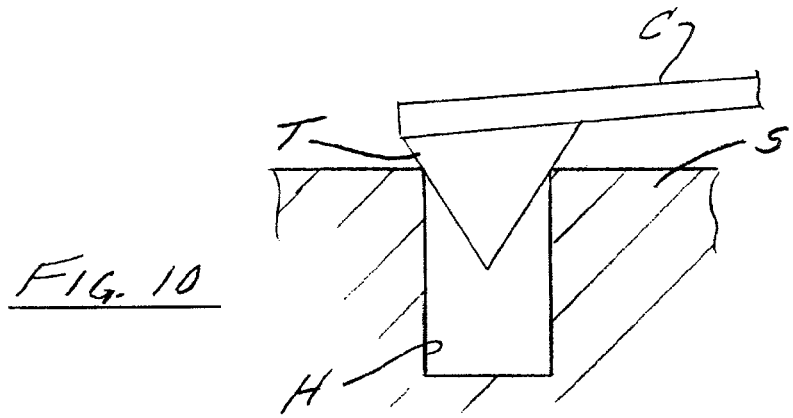
FIG. 10 schematically illustrates a second method of calibrating an AFM to reduce lateral loads imposed on the probe during probe/sample interaction.
Figure 11:
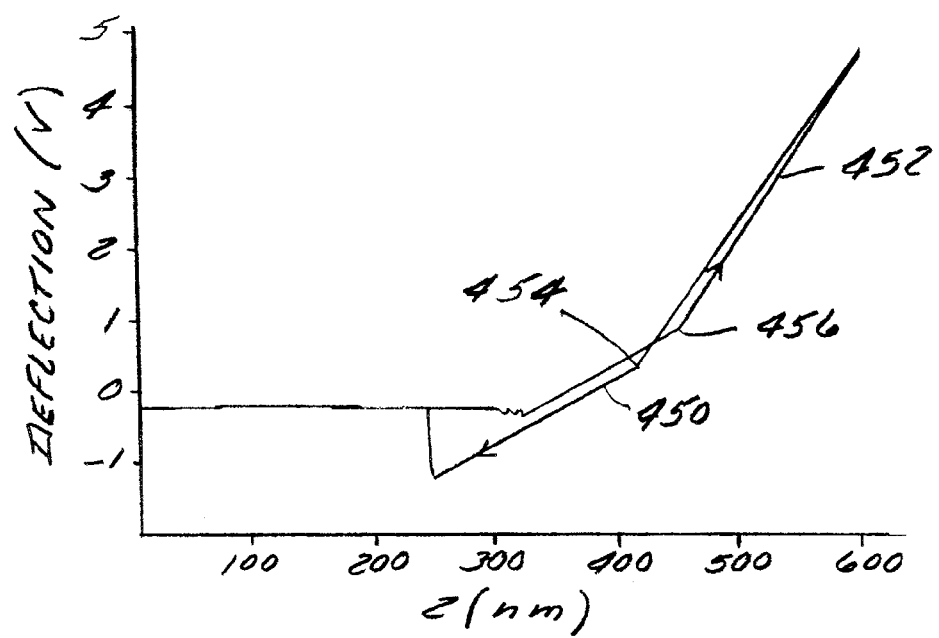
FIGS. 11-13 are a series of graphs illustrating the effects of under-compensation, overcompensation, and adequate compensation using the calibration technique illustrated in FIG. 10.
Figure 12:
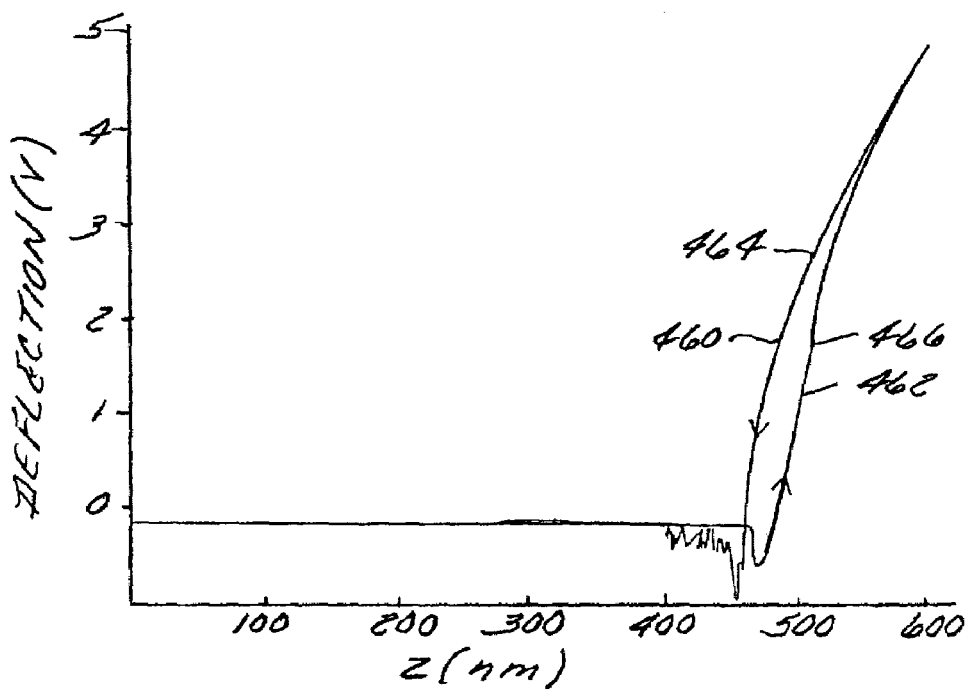
Figure 13:
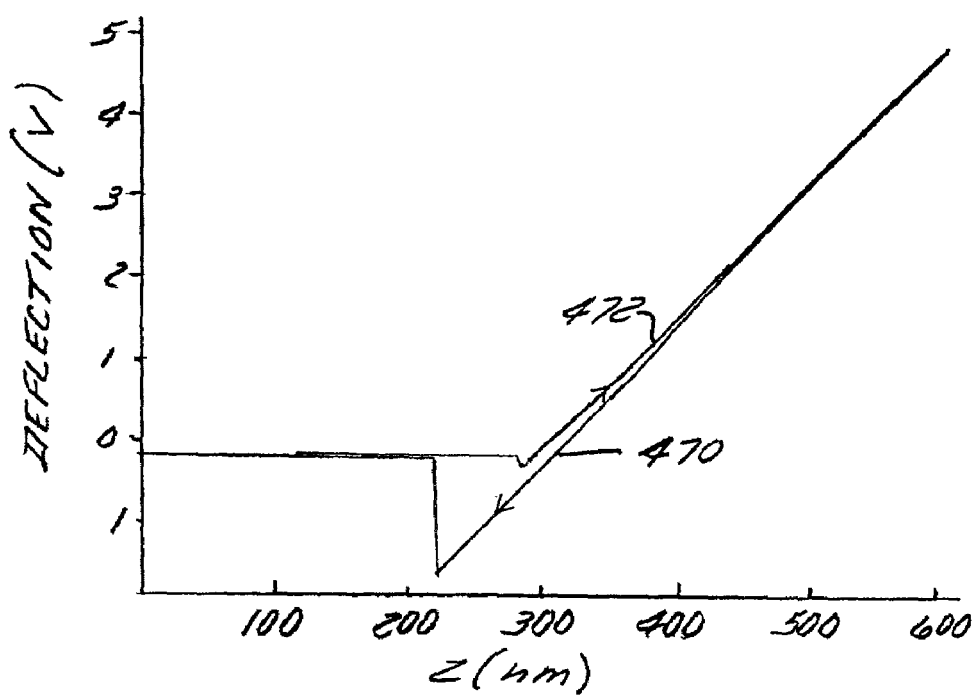

Another calibration technique involves monitoring cantilever deflection as a probe is driven to engage and then disengage a surface topographical feature such as a trench or a deep hole. The term "deep" as used herein means that the bottom of the feature of interest is below the bottom of the tip at all times in order to prevent data skewing that could otherwise occur as a result of engagement between the tip and the bottom of the feature of interest. As seen in FIG. 10, engagement of the tip T with the sides of the feature H prevents lateral motion of the cantilever C in the x direction during the engagement and disengagement process. As a result, lateral forces imposed on the tip T result in buckling of the cantilever C. That buckling results in a sharp change in a deflection curve plotted during the engagement and disengagement phases. The instrument can then be calibrated by adjusting the lateral force compensation control signal until the observed buckling is reduced or at least substantially eliminated. For instance, referring to the deflection curves 450 and 452 of FIG. 11, curve 452 plots the increase in deflection during the probe/sample engagement process and curve 450 plots the decrease during the probe/sample disengagement process. Sharp changes in slope indicative of buckling are observed at points 454 and 456 on the respective curves 450 and 452. That buckling is indicative of either no lateral compensation or under-compensation. Conversely, FIG. 12 illustrates overcompensation in which a point 466 on curve 462 designates a noticeable increase in slope on the engagement phase of the probe/sample interaction process and point 464 on curve 460 indicates a notable reduction in slope during the disengagement phase. In either event, the gain to the xy actuator or the active cantilever can then be adjusted either manually or via software, and the process repeated. FIG. 13 illustrates a situation in which the lateral compensation gain is optimal, leading to no cantilever buckling and no resultant sharp changes in slope of the ingoing or outgoing displacement curves 470 and 472. Hence, the instrument can be calibrated by determining an optimal compensation gain for a full range of cantilever deflections.

Still another technique for calibrating a probe differs from the techniques discussed above in that calibration involves the direct observation of the response of the material to probe sample interaction as opposed to observing the response as a result of cantilever bending. This technique involves the indentation of a sample with an anisotropic material. An anisotropic material is one that has markedly different stiffnesses in opposite directions on the surface. An example of such a material is a polydiacetylene crystal (PDA). PDA or another anisotropic material tears more easily in one surface direction than the other. This characteristic can be used to calibrate an SPM cantilever for lateral force compensation by adjusting the gain to the SPM's xy actuator or its active cantilever to at least substantially eliminate that tearing during a sample indentation process.

Figure 14:
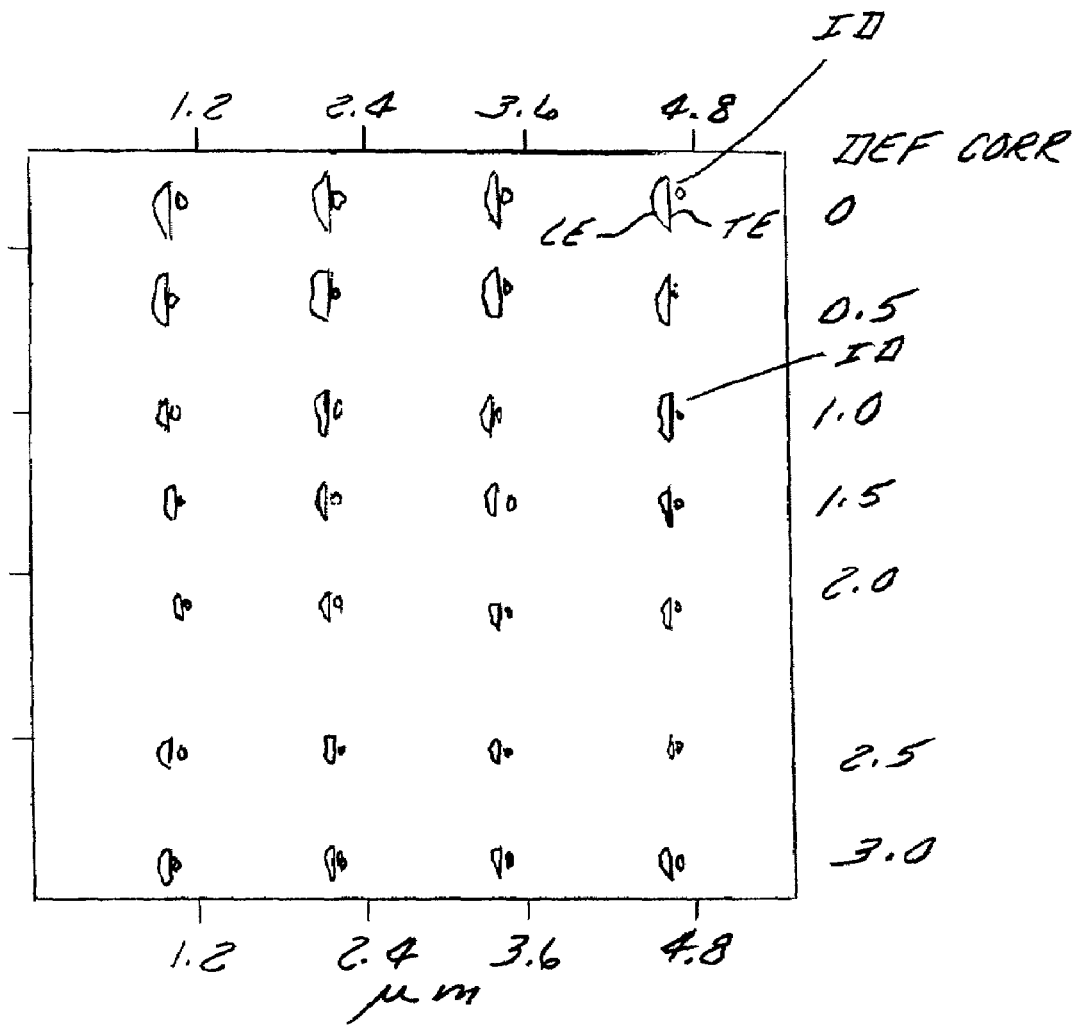
FIG. 14 is an image of indentation data acquired using a third method of calibrating an AFM to reduce lateral loads imposed on the probe during probe/sample interaction.

This calibration process is shown in FIG. 14, which illustrates images of indentations ID acquired at various levels of lateral compensation for various values of cantilever deflection. All indents in this image were made with the same magnitude of cantilever deflection. However, each row of the indents is acquired at a particular lateral compensation, ranging from 0 to 3 volts. As can be seen in the first row of that image, substantial tearing occurs at all values of cantilever deflection at zero compensation. That tearing is denoted by a sharp vertical trailing edge TE on the image with a tapered tear leading away from that edge toward the leading edge LE such that the torn area has generally the shape of an arrowhead. As the gain to the xy actuator or active cantilever is increased from 0.0 V to 3.0 V, that tearing is reduced, then eliminated at correct compensation, and then occurs again at overcompensation. Hence, in this illustrated example, lateral forces are ideally compensated between 2.0 and 2.5 volts.

Each indentation ID may be made and then scanned individually. Preferably, however, all of the indentations are made before any data is acquired, and an image of all of the indentations ID is then obtained using any desired SPM scanning technique such as a TappingMode™ scan. The acquired image can then be analyzed, either manually or via pattern recognition, and the correct compensation for each cantilever deflection level observed and recorded.

Figure 2A:
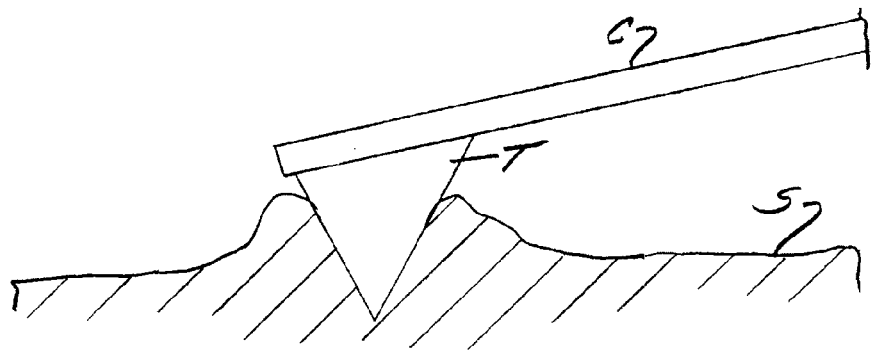
FIGS. 2A-2C schematically illustrate pileup occurring around an AFM probe tip as a result of adequate compensation, under-compensation, and overcompensation, respectively.
Figure 2B:
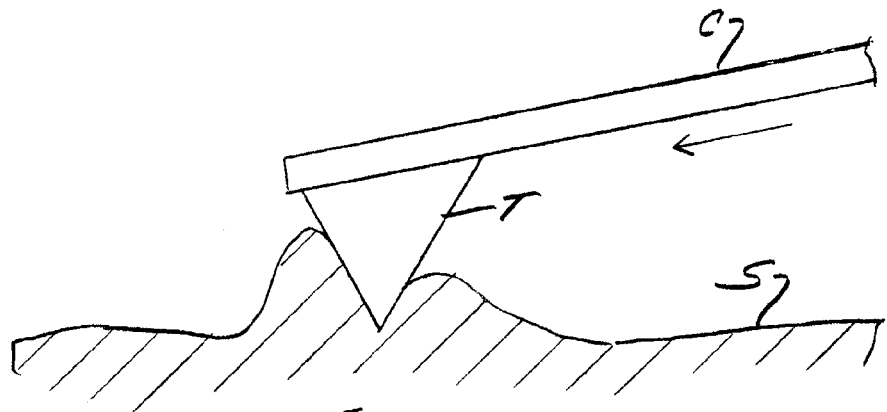
Figure 2C:
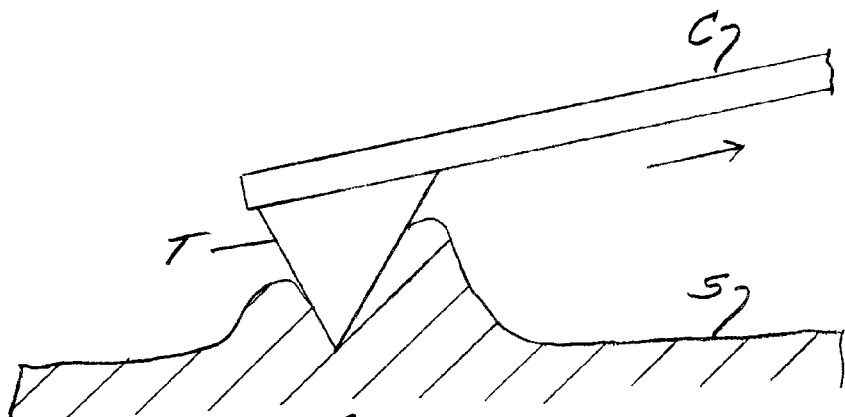
Figure 3:
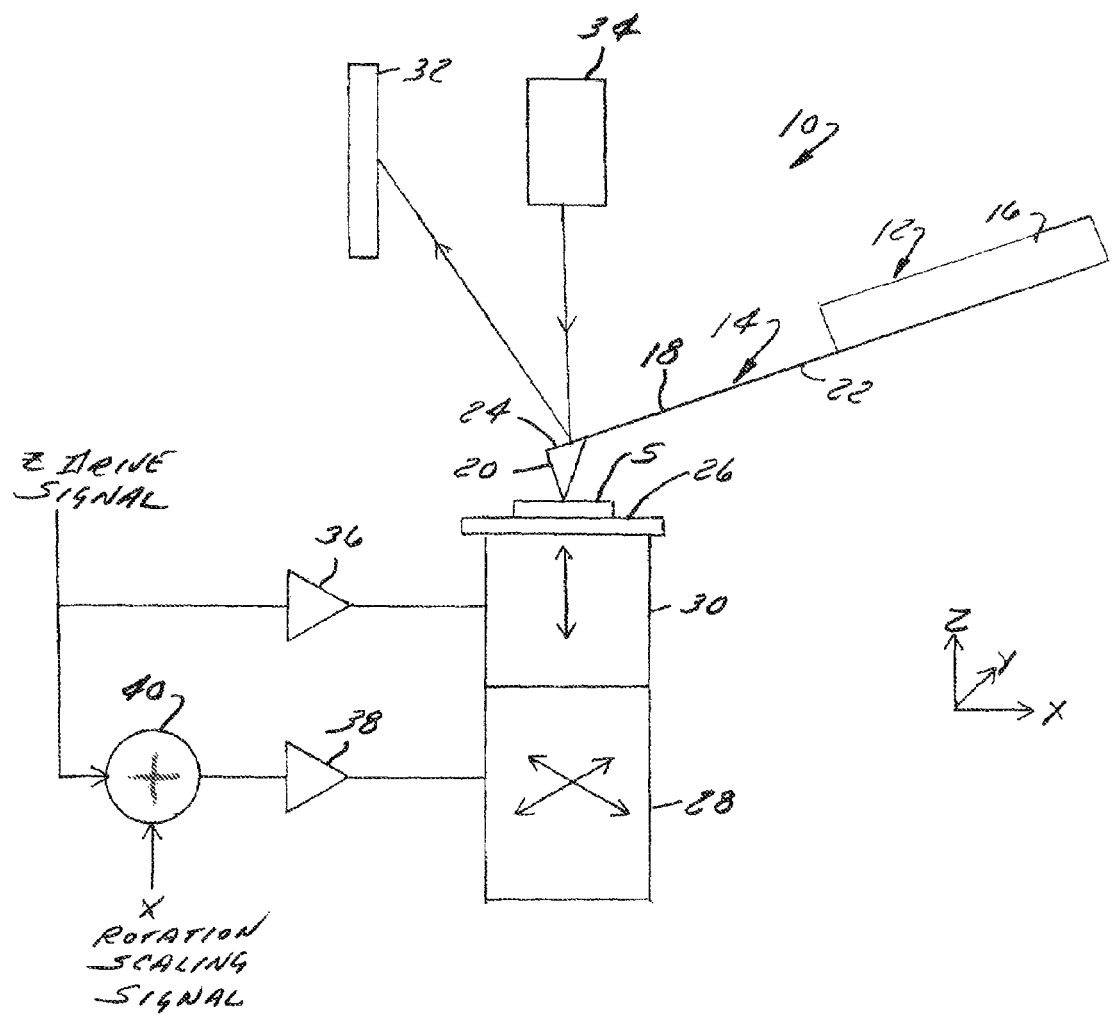
FIG. 3 schematically illustrates an AFM configured to reduce lateral forces on the probe using a prior art technique, and is appropriately labeled PRIOR ART.

A variation of the above-identified technique is to make a direct indentation on any sample, not necessarily an anisotropic sample, that is softer than the cantilever tip and to select a compensation gain that results in uniform pileup ahead of and behind the tip. Hence, referring again to FIGS. 2A-2C, the uniform pileup of FIG. 2A indicates correct compensation for a given magnitude of cantilever deflection, whereas the non-symmetrical pileups of FIGS. 2B and 2C indicate under-compensation and overcompensation, respectively. Uniformity or non-uniformity of pileup could be observed either by determining the area of the pileup in top view or observing the height of the pile up in side view.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. The scope of still other changes to the described embodiments that fall within the present invention but that are not specifically discussed above will become apparent from the appended claims and other attachments.

We claim:

1. A method comprising:
  causing a cantilever-based probe of an instrument to interact with a sample while laterally moving at least a tip of the probe relative to the sample so as to reduce lateral loads that would otherwise be imposed on the probe as a result of probe/sample interaction, the magnitude of the relative lateral motion being a predetermined function of cantilever deflection, wherein the moving step comprises transmitting a lateral compensation signal to an actuator of the instrument that is pre-calibrated prior to the moving step to determine the relationship between cantilever deflection and lateral motion.

2. The method as recited in claim 1, wherein the cantilever is a passive cantilever including a base and a free end portion that bears the tip, and wherein the moving step comprises moving the probe as a whole relative to the sample and is performed directly as a function of cantilever deflection.

3. The method as recited in claim 2, wherein the moving step comprises moving the sample laterally while the probe remains laterally stationary.

4. The method as recited in claim 2, wherein the moving step comprises moving the probe laterally while the sample remains laterally stationary.

5. The method as recited in claim 2, wherein the magnitude of the relative lateral motion is a predetermined direct function of measured cantilever deflection.

6. The method as recited in claim 1, wherein the probe is an active probe which has an active cantilever including a base, a free end portion that bears the tip and an actuator that is selectively energizable to bend the cantilever, and wherein the moving step is performed as a function of a drive signal supplied to the active cantilever.

7. The method as recited in claim 6, wherein the moving step is performed without measuring an angle of the free end of the cantilever.

8. The method as recited in claim 1, wherein the relative lateral motion is controlled in an open loop manner without feedback.

9. A method comprising:
causing a cantilever-based probe of an instrument to interact with a sample while laterally moving at least a tip of the probe relative to the sample so as to reduce lateral loads that would otherwise be imposed on the probe as a result of probe/sample interaction, the magnitude of the relative lateral motion being a predetermined function of cantilever deflection, wherein the moving step comprises transmitting a lateral compensation signal to an actuator of the instrument that is pre-calibrated prior to the moving step to determine the relationship between cantilever deflection and lateral motion; and, prior to the causing step
calibrating the instrument to obtain lateral compensation signals for a range of cantilever deflection values.

10. The method as recited in claim 9, wherein the calibrating step comprises, for a particular cantilever deflection value, adjusting a magnitude of the lateral compensation signal so that an image of a particular feature remains at least substantially un-shifted when the cantilever deflection value is changed.

11. The method as recited in claim 10, wherein the calibrating step comprises,
scanning the feature at the particular cantilever deflection value and obtaining an initial image of the feature, then changing cantilever deflection value, then
scanning the feature again and obtaining images of the feature while adjusting the magnitude of the lateral compensation signal until any observed lateral shifts in the images, as compared to the initial image, are at least substantially eliminated.

12. The method as recited in claim 11, wherein the calibrating step comprises adjusting the magnitude of the compensation signal to at least substantially eliminate changes in the slope of displacement curves generated from the engagement process.

13. The method as recited in claim 9, wherein the calibrating step comprises, for a particular cantilever deflection value obtained when engaging a deep feature with the probe, adjusting the lateral compensation signal to at least substantially eliminate cantilever buckling during the engagement process.

14. The method as recited in claim 9, wherein the calibrating step comprises, for a particular cantilever deflection value obtained when indenting a tearable material, adjusting the magnitude of the lateral compensation signal to at least substantially eliminate material tearing caused by deflection induced tip lateral loads.

15. The method as recited in claim 14, wherein the material is an anisotropic material.

16. The method as recited in claim 9, wherein the calibrating step comprises, for a particular cantilever deflection value obtained when indenting a sample having a surface that is softer than the tip of the probe, adjusting the magnitude of the lateral compensation signal to achieve at least substantially uniform pileup of material ahead of and behind the tip.

17. A method comprising:
decreasing the spacing between a sample and a probe of a probe-based instrument, the probe including a passive cantilever having a fixed end and a free end portion that bears a tip, the cantilever deflecting as a result of probe/sample interaction occurring during at least part of the decreasing step, and
during the decreasing step, energizing an actuator to move the sample relative to the probe to at least substantially eliminate lateral loads that would otherwise be imposed on the probe as a result of the probe/sample interaction, the magnitude of movement being a direct function of actual cantilever deflection and being predetermined prior to the decreasing step.

18. The method as recited in claim 17, wherein the magnitude of the relative lateral motion is a predetermined direct function of measured cantilever deflection.

19. The method as recited in claim 17, wherein the relative lateral motion is controlled in an open loop manner without feedback.

20. A method comprising:
decreasing the spacing between a sample and a tip of a probe of a probe-based instrument, the probe including an active cantilever having a fixed end, a free end portion that bears the tip, and an actuator that is selectively energizable to bend the cantilever, the cantilever deflecting as a result of probe/sample interaction occurring during at least part of the decreasing step, and
during the decreasing step, energizing an actuator to move at least the tip of the probe laterally relative to the sample to at least substantially eliminate lateral loads that would otherwise be imposed on the probe as a result of the probe/sample interaction, the magnitude of movement being a predetermined function of a monitored drive signal supplied to the active cantilever and being predetermined prior to the decreasing step, the monitored drive signal being a function of actual cantilever deflection.

21. The method as recited in claim 20, wherein the moving step comprises energizing the active cantilever to move the probe tip.

22. The method as recited in claim 20, wherein the moving step comprises energizing a separate actuator to move at least one of the probe as a whole and the sample laterally.

23. An instrument comprising:
(A) a probe including a cantilever and a tip mounted on the cantilever; and (B) a controller that transmits a lateral compensation signal to at least one actuator to move at least the tip of the probe relative to a sample while the probe is interacting with the sample so as to at least substantially eliminate lateral loads that would otherwise be imposed on the probe as a result of probe/sample interaction, the lateral compensating signal being a predetermined function of cantilever deflection that is predetermined prior to the probe-sample interaction.

24. The instrument as recited in claim 23, wherein the cantilever is a passive cantilever including a base and a free end portion that bears the tip, and wherein the controller controls an actuator directly as a function of cantilever deflection to move the probe as a whole relative to the sample to effect lateral load reduction.

25. The instrument as recited in claim 24, wherein the controller controls an xy actuator to move the sample laterally while the probe remains laterally stationary.

26. The instrument as recited in claim 24, wherein the controller controls an xy actuator to move the probe laterally while the sample remains laterally stationary.

27. The instrument as recited in claim 23, wherein the cantilever is an active cantilever including an actuator that is selectively energizable to bend the cantilever, wherein the controller controls the actuator as a function of a drive signal supplied to the active cantilever.

28. The instrument as recited in claim 23, wherein the lateral compensation signal is pre-calibrated prior moving the probe tip relative to the sample.

29. The instrument as recited in claim 23, wherein the lateral compensation signal is a predetermined direct function of measured cantilever deflection.

30. The instrument as recited in claim 23, wherein the lateral compensation signal is generated in an open loop manner without feedback.

31. A method comprising:

causing a cantilever-based probe of an instrument to interact with a sample; and, during the causing step;

monitoring a parameter indicative of actual cantilever deflection resulting from probe/sample interaction, and, in response to the monitoring step, laterally moving at least a tip of the probe relative to the sample so as to reduce lateral loads that would otherwise be imposed on the probe as a result of probe/sample interaction, the magnitude of the relative lateral motion being a predetermined function of actual cantilever deflection, wherein the moving step comprises transmitting a lateral compensation signal to an actuator of the instrument that is pre-calibrated prior to the moving step to determine the relationship between actual cantilever deflection and lateral motion.

32. The method as recited in claim 31, wherein the cantilever is a passive cantilever including a base and a free end portion that bears the tip, and wherein the moving step comprises moving the probe as a whole relative to the sample and is performed directly as a function of monitored cantilever deflection, and wherein the monitoring step comprises measuring cantilever deflection.

33. The method as recited in claim 31, wherein the probe is an active probe which has an active cantilever including a base, a free end portion that bears the tip, and an actuator that is selectively energizable to bend the cantilever, and wherein the monitoring step comprises monitoring a drive signal supplied to the active cantilever.

* * * * *